US005933529A

United States Patent [19]
Kim

[11] Patent Number: 5,933,529
[45] Date of Patent: *Aug. 3, 1999

[54] METHOD OF TRACING A CONTOUR OF AN OBJECT BASED ON BACKGROUND INFORMATION OF THE OBJECT

[75] Inventor: Jin-Hun Kim, Seoul, Rep. of Korea

[73] Assignee: Daewoo Electronics Co., Ltd., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,296

[22] Filed: Dec. 24, 1996

[51] Int. Cl.$^6$ .............................. G06K 9/48; G06K 9/46; G06K 9/66; G06K 9/40

[52] U.S. Cl. ...................... 382/199; 382/194; 382/195; 382/203; 382/266; 348/26

[58] Field of Search ................................ 382/199, 192, 382/194, 195, 201, 203, 205, 256, 266, 271; 348/26

[56] References Cited

U.S. PATENT DOCUMENTS

| | | | |
|---|---|---|---|
| 4,843,568 | 6/1989 | Krueger et al. | 382/199 |
| 5,073,960 | 12/1991 | Nakai et al. | 382/199 |
| 5,119,439 | 6/1992 | Osawa et al. | 382/199 |
| 5,197,108 | 3/1993 | Watanabe | 382/199 |
| 5,379,350 | 1/1995 | Shimaza et al. | 382/199 |
| 5,583,949 | 12/1996 | Smith et al. | 382/199 |
| 5,592,562 | 1/1997 | Rooks | 382/150 |
| 5,754,709 | 5/1998 | Moriya et al. | 382/199 |
| 5,757,972 | 5/1998 | Murayama | 382/199 |

OTHER PUBLICATIONS

Cabrelli C A et al., "Automatic Representation of Binary Images" IEEE Transactions on Pattern Analysis and Machine Intelligence, vol. 12, No. 12, Dec. 1, 1990, pp. 1190–1196.

Takeshi Agui et al., "Topological Structure Analysis of Pictures by Digital Computer" Systems. Computers. Controls, vol. 10, No. 3, May 1979–Jun. 1979, pp. 10–19.

Theo Pavlidis, "Algorithms for Graphics and Image Processing" Computer Science Press, 1982, pp. 68–69, pp. 142–148 & pp. 152–155.

Kwok P C K, "A Thinning Algorithm by Contour Generation" Communications of the Association for Computing Machinery, vol. 31, No. 11, Nov. 1, 1988, pp. 1314–1324.

AGI I et al., "An Expandable VLSI Processor Array Approach to Contour Tracing" ICASSP 88; VLSI Spectral Estimation, vol. 4, Apr. 11–14, pp. 1969–1972.

Irwin Sobel, "Neighborhood Coding of Binary Images for Fast contour Following and General Binary Array Processing" Computer Graphics and Image Processing, vol. 8, No. 1, Aug. 1978, pp. 127–135.

*Primary Examiner*—Bipin H. Shalwala
*Attorney, Agent, or Firm*—Anderson, Kill & Olick, P.C.

[57] ABSTRACT

A method for tracing a contour of an object in an image of a video signal, the image including object pixels and background pixels, indexes each of the background pixels; detects contour pixels; groups the contour pixels to thereby provide one or more groups of contour pixels, each contour pixel in a group adjoining one or more background pixels of a same background index; and traces the contour pixels on a group-by-group basis.

10 Claims, 5 Drawing Sheets

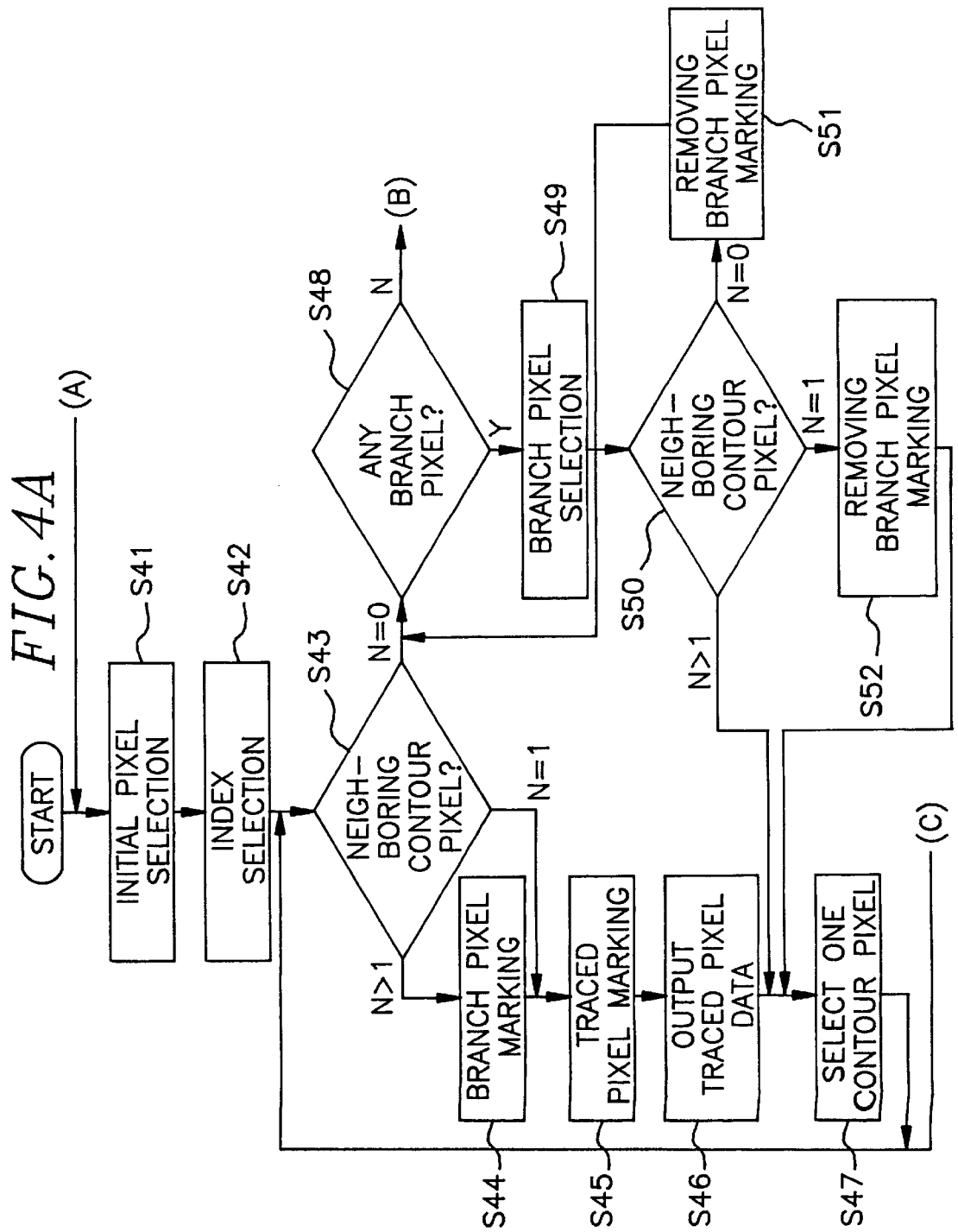

5,933,529

METHOD OF TRACING A CONTOUR OF AN OBJECT BASED ON BACKGROUND INFORMATION OF THE OBJECT

FIELD OF THE INVENTION

The present invention relates to a method for extracting and tracing a contour of an object in a video signal; and, more particularly, to a method capable of tracing accurately and effectively the contour corresponding to the object by tracing the contour based on background information of the object.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motion, contour and pixel data of each object are processed through different encoding channels.

The contour data, in processing the contour of an object, is very important in order to analyze and synthesize the shape of the object and the contour data is normally obtained by detecting variations in neighboring pixel values through a contour detector.

However, contour data of a single contour obtained from such a conventional tracing method may be necessarily encoded as a plurality of contour data schemes which may not be adequately correlated with each other, especially when the shape of the contour is complicated.

SUMMARY OF THE INVENTION

It is, therefore, a primary object of the invention to provide a contour tracing method which is capable of tracing accurately and effectively the contour of an object by tracing the contour based on background information of the object, thereby correlating all the contour pixels in a stream of contour data.

In accordance with the invention, there is provided a method for tracing a contour of an object in an image of a video signal, the image including object pixels and background pixels, comprising the steps of:

(a) indexing each of the background pixels, wherein the background pixels adjacent to each other are of an identical background index;

(b) detecting contour pixels, wherein each contour pixel is an object pixel having one or more background pixels among its neighboring pixels;

(c) grouping the contour pixels to thereby provide one or more groups of contour pixels, each contour pixel in a group adjoining one or more background pixels of a same background index; and (d) tracing the contour pixels on a group-by-group basis.

BRIEF DESCRIPTION OF THE DRAWINGS

The above and other objects and features of the present invention will become apparent from the following description of preferred embodiments given in conjunction with the accompanying drawings, in which:

FIGS. 4A and 4B describe details of the contour tracing method by contour pixel tracing block shown in FIG. 1.

DETAILED DESCRIPTION OF THE PREFERRED EMBODIMENTS

Figure 1:
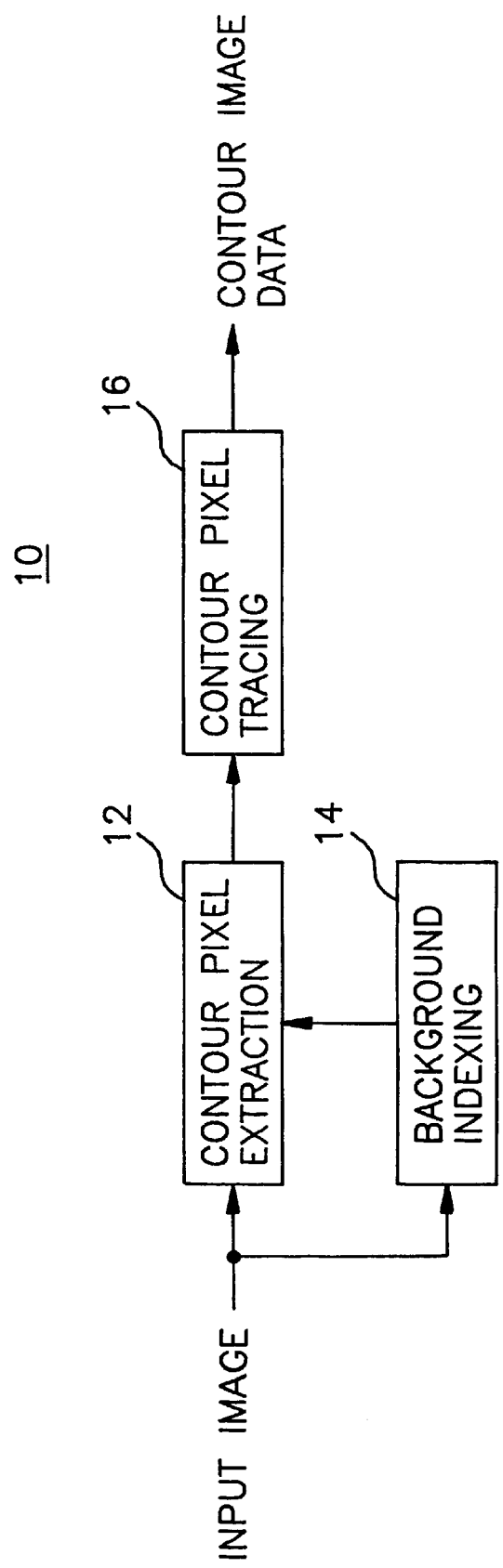
FIG. 1 represents a block diagram of a contour tracing apparatus in accordance with the present invention.

In FIG. 1, there is shown a block diagram of a contour tracing apparatus 10 in accordance with the present invention. A video signal of an input image is fed to a contour pixel extraction block 12 and a background indexing block 14. The input image includes one or more objects and backgrounds and is represented, e.g., in a form of a bit map, wherein an object and a background pixels are represented by, e.g., 1 and 0, respectively. In another instance, the bit map can be constituted so that all the background pixels are represented by zero values and the object pixels have any non-zero values. In any case, the object and the background pixels can be easily distinguished from each other by comparing each of those with a predetermined threshold value, e.g., 0.5.

Figure 2:
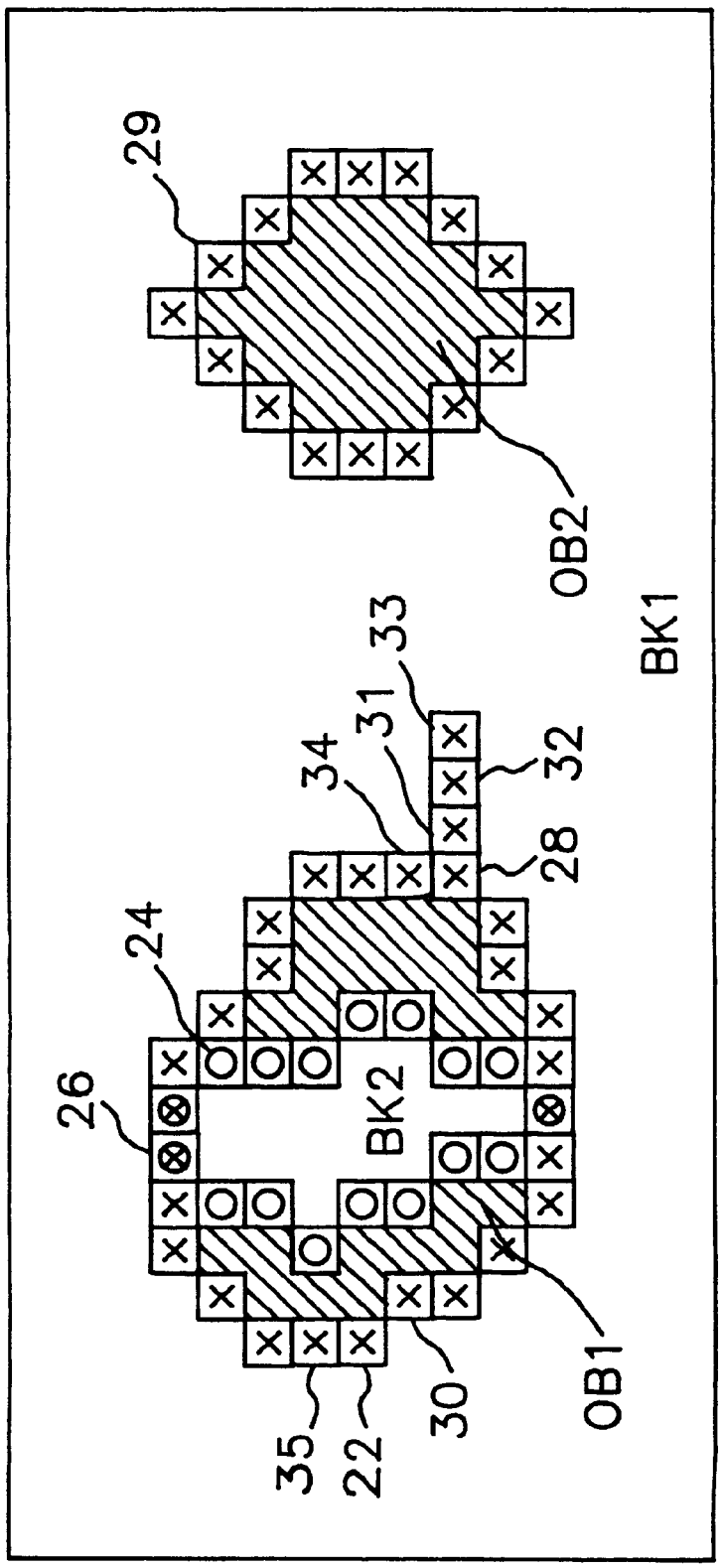
FIG. 2 shows an example of an image data having two separate objects, one of which has an inner background and a branch contour.

At the background indexing block 14, background pixels are indexed so that background pixels adjacent to each other are assigned to have an identical background index. Referring to FIG. 2, there is illustrated an exemplary input image having two objects OB1 and OB2. In accordance with the present invention, background pixels outside the objects OB1 and OB2 are all connected with each other, and, therefore, they are assigned to have, e.g., an index BK1. Likewise, background pixels inside the object OB1 are assigned to have a BK2 index. Background pixel information indicating an index for each of the background pixels is fed to the contour pixel extraction block 12. In FIG. 2, circle (o) and/or cross (x) marked pixels, e.g., 22 to 35, represent contour pixels which will be described with reference to FIG. 3.

At the contour pixel extraction block 12, responsive to the input image and the background pixel information fed from the background indexing block 14, contour pixels and their indices are determined and contour pixel information is outputted to a contour pixel tracing block 16, the contour pixel information representing positions and indices of the determined contour pixels. Selection of the contour pixels and determination of the indices thereof are carried out in accordance with the procedure depicted in FIG. 3.

Figure 3:
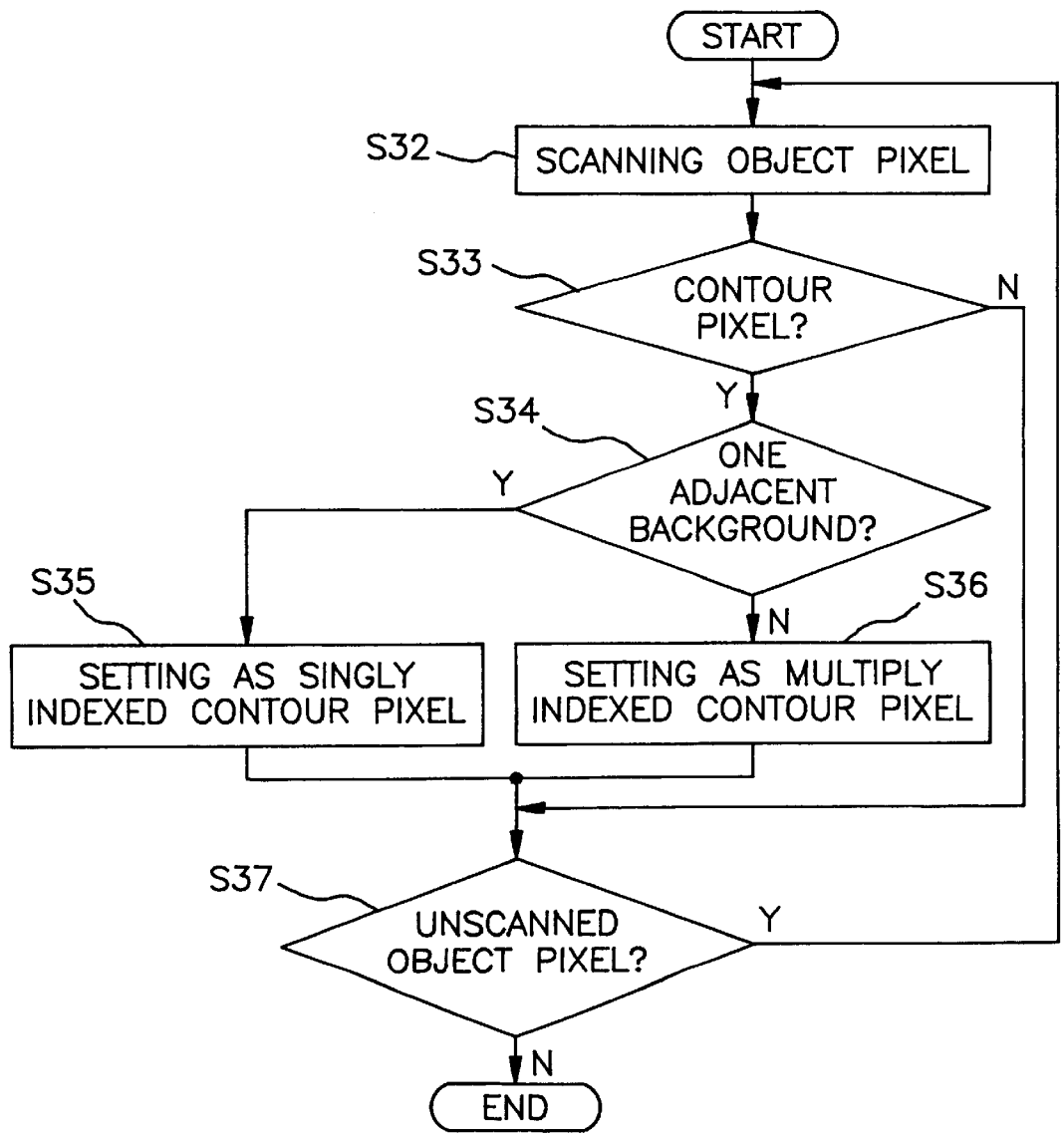
FIG. 3 provides an explanatory diagram for illustrating selection of contour pixels and determination of indices thereof by contour pixel extraction block shown in FIG. 1.

Referring to FIG. 3, the procedure starts with step S32, wherein one of the object pixels constituting the object OB1 and OB2 is selected as a scanned object pixel to be checked at a next step 33 whether it is a contour pixel. In a preferred embodiment of the invention, it is assumed that the pixels in the input image is of a rectangular pattern, i.e., a pixel has 4 first neighboring pixels with it along the horizontal and the vertical directions and 4 second neighboring pixels with it along the diagonal directions. In determining the contour pixel, it is tested whether any one of the 4 first neighboring pixels with the scanned object pixel is a background pixel. If the scanned object pixel is determined as a non-contour pixel, i.e., if its 4 first neighboring pixels are all object pixels, the process proceeds to step S37. On the other hand, if it is decided that the scanned object pixel is a contour pixel, i.e., if one or more of its 4 first neighboring pixels are background pixels, then the procedure goes to step S34.

At step S34, it is checked whether the scanned object pixel adjoins only one background. In other words, if one or more background pixels which belong to 4 first neighboring pixels with the scanned object pixel are found to be of an identical background index at step S34, the process goes to step S35 wherein a single index is assigned to the contour pixel. For instance, the contour pixels 22, 28, 29, 30, 31, 32, 33, 34, 35 shown in FIG. 2 have background pixels of the BK1 index among their first neighboring pixels, and, accordingly, they are indexed as, e.g., CP-1 contour pixels. The contour pixel 24 is assigned as a CP-2 contour pixel because it adjoins a BK2 background pixel. If it is determined, at step S34, that the contour pixel has more than one background pixels of different indices among 4 first neighboring pixels, such contour pixel, e.g., contour pixel 26 shown in FIG. 2, is multiply indexed as, e.g., CP-1,2 at step S36. At a subsequent step S37, it is checked if there is any unscanned object pixel and, if there is, then the process goes back to step S32 to repeat the procedure until all the object pixels are scanned.

Returning to FIG. 1, in response to the contour pixel information from the contour pixel extraction block 12, the contour pixel tracing block 16 traces the contour in accordance with the preferred embodiment of the invention described in detail with reference to FIG. 4 and outputs a resultant contour image to a next processor, e.g., a contour encoder (not shown) for the encoding thereof.

Figure 4B:
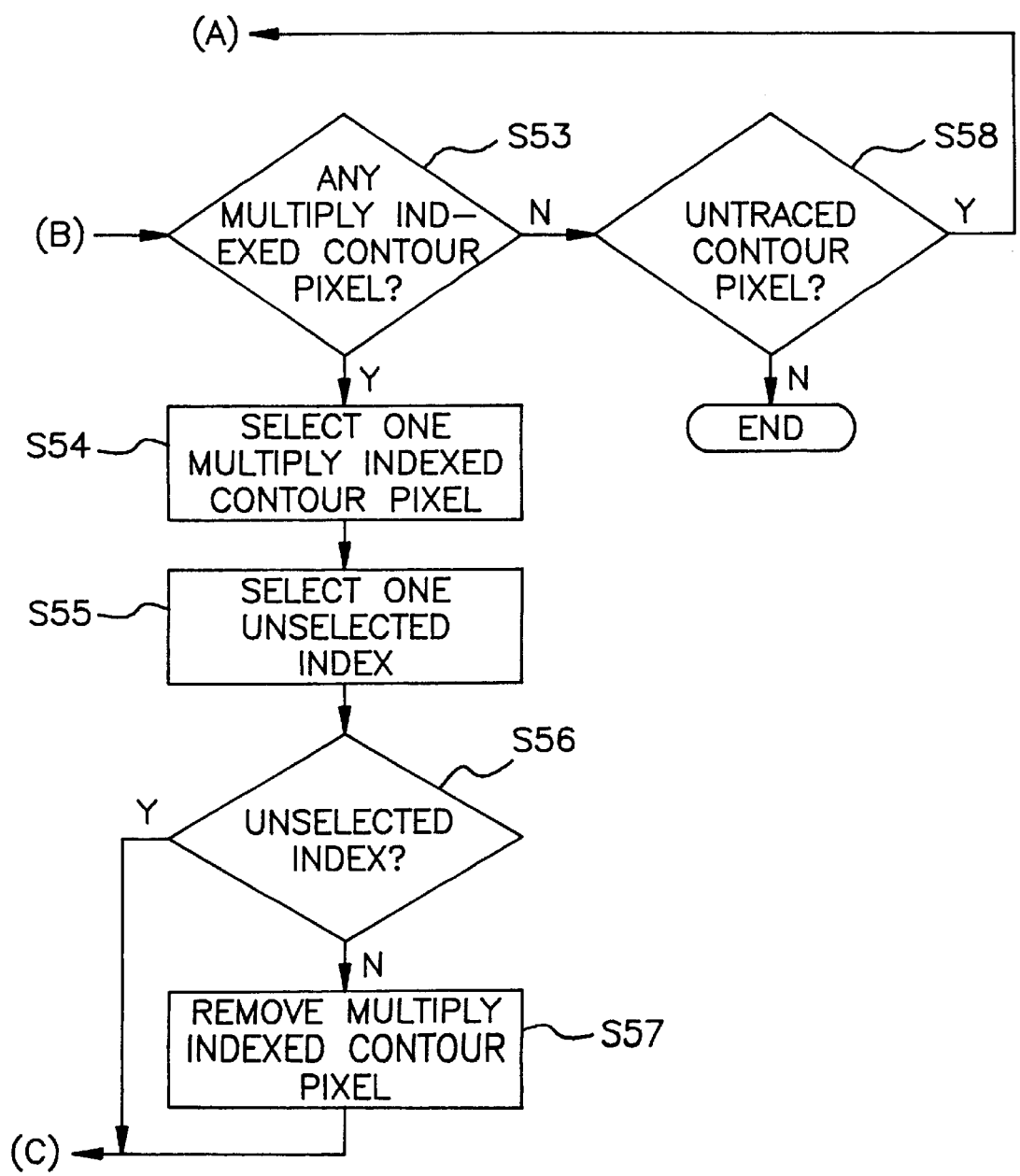

Referring to FIGS. 4A and 4B, there are described details of a contour tracing method of the present invention. At step S41, one of the contour pixels determined at the contour pixel extraction block 12 shown in FIG. 1 is selected and at a subsequent step S42, one of the indices of the selected pixel is chosen. That is, if the contour pixel 22 shown in FIG. 2 is selected, the index CP-1 thereof is chosen as a tracing index; and in case the multiply indexed contour pixel 26 happened to be selected, one of the indices thereof, CP-1 or CP-2, is chosen as the tracing index. At a following step S43, the number of neighboring contour pixels having the same tracing index with the selected pixel is counted, wherein the neighboring contour pixel represents a contour pixel included to the total 8 number of the first and the second neighboring pixels with the selected pixel. When the counted number N of the contour pixels neighboring with the selected pixel having the chosen tracing index is greater than 1, at a next step S44, the selected pixel is marked as a branch pixel and step S45 is followed thereafter. On the other hand, when the number N is equal to 1, the process goes to step S45 directly, and for N=0, the process proceeds to step S48.

At step S45, the selected pixel is marked as a traced pixel and, at the subsequent step S46, traced pixel data representing position of the traced pixel is outputted to the next processor, e.g., the contour encoder (not shown) mentioned above, wherein the traced pixel data constitutes the contour image data generated from the contour pixel tracing block 16 shown in FIG. 1. Thereafter, at step S47, either one of the neighboring contour pixels with the traced pixel for the case N>1 or the only neighboring contour pixel with the traced pixel for the case N=1 is selected as a candidate pixel for next-tracing and the process returns to step S43 with the candidate pixel as the selected pixel, wherein the tracing index of the selected pixel is equal to that of the traced pixel. It should be noted that traced pixels are excluded at step S43 in counting the number of neighboring contour pixels and at step S47 in selecting a neighboring contour pixel as the candidate pixel for next-tracing.

As for an illustration, if it is assumed that the contour pixel 22 in FIG. 2 is first selected to start the contour tracing procedure described above, the contour pixel 22 is registered as a branch pixel at step S44; and if a contour pixel 30 is chosen as the candidate pixel for next-tracing at step S47, contour tracing is carried out counterclockwise along a lower part of the periphery of the object OB1 and a contour pixel 28 is marked as a branch pixel at step S44. Further, if a contour pixel 34 is selected at step S47, between two contour pixels 31, 34 neighboring with the branch pixel 28, the upper part of the outer periphery is traced thereafter, ending at a last contour pixel 35 of the outer periphery selected at step S47 and leaving contour pixels 31 to 33 untraced.

Referring back to FIGS. 4A and 4B, the number of neighboring contour pixels with the last contour pixel 35 is counted at step S43. Since the number N of its untraced neighboring contour pixels is zero, the process goes to step S48, wherein it is checked whether there is any branch pixel among the traced pixels. In the exemplary case illustrated in FIG. 2, the contour pixels 22 and 28 are found to be branch pixels at step 48 and at a next step S49 one of the branch pixels, e.g., contour pixel 22 or 28 is selected. At a next step S50, the branch pixel selected in step S49 is tested whether any one of the neighboring contour pixels thereof is an untraced contour pixel having the tracing index selected in step S42. If the number N of neighboring contour pixels conforming to the criterion specified in step S50 is larger than one, one of such pixels is newly selected as a candidate pixel to trace at the next step S47 and the process returns to step S43 with the candidate pixel as the selected pixel. When N=1 at step S50, the branch pixel mark on the branch pixel is removed at step S52 so that the pixel will not be considered as a branch pixel anymore and, at the next step S47, the contour pixel counted at step S50 is newly chosen as a candidate pixel to trace and the process returns to step S43 with the candidate pixel as the selected pixel. For the case N=0 at step S50, the branch pixel selected at step S49 loses its mark thereon at step S51 and the process returns to step S48. In accordance with the procedure described above, remaining contour pixels, e.g., 31 to 33 shown in FIG. 2, are traced and all the branch pixels registered at step S44 are removed; and consequently, no more branch pixels are left to be selected at step S48 and the tracing process proceeds to step S53.

At step S53, it is checked whether there are any multiply indexed contour pixels among the contour pixels traced. If there are, one of such contour pixels is selected at step S54. At a next step S55, one of the indices unselected to trace so far is chosen among the indices of the selected multiply indexed contour pixel. Thereafter, at step S56, it is checked whether there remains any index unselected among the indices of the selected multiply indexed contour pixel. If there are no more unselected indices left, i.e., if the index selected at step S55 is the last unselected index of the selected multiply indexed contour pixel, multiple indexing of the selected multiply indexed contour pixel is removed at step S57 so that it will not regarded as a multiply indexed contour pixel at step S53 anymore, and the process returns to step S43 to perform contour tracing with respect to contour pixels having newly selected index. If it is found at step S56 that there still remain unselected indices, the process goes directly to step S43. By performing the process described above, contour pixels neighboring with the BK2 background shown in FIG. 2 can be traced. For instance, it is assumed that the multiply indexed contour pixel 26 is selected at step S54, and then the CP-2 index thereof is selected thereafter at step S55. Since the CP-1,2 indices have been selected in the previous steps S42 and S55, at step S57, the multiple indexing of the contour pixel 26 is removed and the contour tracing of CP-2 contour pixels is carried out by starting from step S43. In tracing the contour pixels with respect to the newly selected index, the traced pixel marking carried out at step S45 during the contour tracing for the previous selected index is disregarded. In a similar manner described above, the circled contour pixels having CP-2 index shown in FIG. 2 are traced while the multiply indexed contour pixels including the contour pixel 26 are traced twice. After tracing all the contour pixels of the newly select index and removing multiple indexing of the multiply indexed contour pixels, it is determined at step S53 that there remain no more multiply indexed contour pixels among the traced contour pixels. In such an instance, at the following step S58, it is checked if there are any untraced contour pixels left. For the input image shown in FIG. 2, contour pixels of the object OB2 are still untraced, and, therefore, the process returns to step S41 to trace the contour pixels of the object OB2 in the manner described above. After completing the contour tracing of the object OB2, there will be no further contour pixels left to be traced and the contour tracing procedure is terminated thereafter.

While the present invention has been described with respect to the particular embodiments, it will be apparent to those skilled in the art that various changes and modifications may be made without departing from the scope of the invention as defined in the following claims.

What is claimed is:

1. A method for tracing a contour of an object in an image of a video signal, the image including object pixels and background pixels, comprising the steps of:
   (a) indexing each of the background pixels, wherein the background pixels adjacent to each other are indexed with an identical background index and background pixels in different backgrounds have different indices;
   (b) detecting contour pixels, wherein each contour pixel is an object pixel having one or more background pixels among its neighboring pixels;
   (c) grouping the contour pixels to thereby provide more than one group of contour pixels, each contour pixel in a group adjoining one or more background pixels of a same background index; and
   (d) tracing the contour pixels on a group-by-group basis;
   wherein if a contour pixel includes, among its neighboring pixels, background pixels of different background indices, said contour pixel is included in groups corresponding to said different background indices; and
   wherein the step of tracing the contour pixels in a group is initiated from the contour pixel adjoining said background pixels of different background indices.

2. A method for tracing a contour of an object in an image of a video signal, wherein the image includes object pixels and background pixels of a rectangular pattern, a pixel in the rectangular pattern having four first neighboring pixels along the horizontal and the vertical directions and four second neighboring pixels along diagonal directions, comprising the steps of:
   (a) dividing the background pixels into one or more sets of background pixels;
   (b) assigning an index to each background pixel in a set, wherein the background pixels in different sets have different indices;
   (c) checking whether the first neighboring pixels of each object pixel include one or more background pixels;
   (d) defining each object pixel as a contour pixel if said each object pixel includes one or more background pixels among its first neighboring pixels;
   (e) assigning, to each contour pixel, indices corresponding to said one or more background pixels;
   (f) grouping contour pixels to thereby provide more than one group of contour pixels, the contour pixels in a group having a same index; and
   (g) tracing the contour pixels based on the first and second neighboring pixels thereof on a group-by-group basis;
   wherein, in step (e), if multiple indices are assigned to a contour pixel, the contour pixel of the multiple indices is included in groups of contour pixels corresponding to the multiple indices.

3. The method according to claim 2, wherein said tracing step (g) includes the steps of:
   (g1) selecting a group of contour pixels of a first index;
   (g2) choosing a contour pixel in the group as a traced pixel;
   (g3) counting the number of neighboring contour pixels of the first index among the first and the second neighboring pixels of the traced pixel;
   (g4) if the number is greater than one, marking the traced pixel as a branch pixel and selecting one of the neighboring contour pixels counted in the step (g3) as a next traced pixel, and if the number is one, selecting the neighboring contour pixel counted in the step (g3) as the next traced pixel; and
   (g5) repeating said steps (g3) and (g4) with respect to the next traced pixel, wherein, in repeating the step (g3), a traced pixel of the first index included in the first and the second neighboring pixels of the next traced pixel is not considered as a neighboring contour pixel of the next traced pixel.

4. The method according to claim 3, wherein said tracing step (g) further includes, after the step (g5), the steps of:
   (g6) if the number is zero, selecting one of the neighboring contour pixels, if any, as the next traced pixel; and
   (g7) repeating said steps (g5) and (g6) until all the contour pixels of the first index are traced.

5. The method according to claim 4, wherein said tracing step (g) further includes, after the step (g7), the steps of:
   (g8) selecting a group of contour pixels of a next index if any;
   (g9) repeating said steps (g2) to (g8) with respect to the group selected in the step (g8) until all the contour pixels of the object are traced.

6. The method according to claim 5, wherein a contour pixel having the first and the next indices is chosen as the traced pixel in the step (g2) for the next index.

7. The method according to claim 1, wherein said tracing step (d) includes the steps of:

(d1) selecting a group of contour pixels of a first index;

(d2) choosing a contour pixel in the group as a traced pixel;

(d3) counting the number of neighboring contour pixels of the first index among first and second neighboring pixels of the traced pixel;

(d4) if the number is greater than one, marking the traced pixel as a branch pixel and selecting one of the neighboring contour pixels counted in the step (d3) as a next traced pixel, and if the number is one, selecting the neighboring contour pixel counted in the step (d3) as the next traced pixel; and (d5) repeating said steps (d3) and (d4) with respect to the next traced pixel, wherein, when repeating the step (d3), a traced pixel of the first index included in the first and the second neighboring pixels of the next traced pixel is not considered as a neighboring contour pixel of the next traced pixel.

8. The method according to claim 7, wherein said tracing step (d) further includes, after the step (d5), the steps of:

(d6) if the number is zero, selecting one of the neighboring contour pixels, if any, as the next traced pixel; and (d7) repeating said steps (d5) and (d6) until all the contour pixels of the first index are traced.

9. The method according to claim 8, wherein said tracing step (d) further includes, after the step (d7), the steps of:

(d8) selecting a group of contour pixels of a next index if any;

(d9) repeating said steps (d2) to (d8) with respect to the group selected in the step (d8) until all the contour pixels of the object are traced.

10. The method according to claim 9, wherein a contour pixel having the first and the next indices is chosen as the traced pixel in the step (d2) for the next index.

* * * * *